March 28, 1950      A. H. BATES      2,501,659
RING BORING MACHINE
Filed Jan. 2, 1946
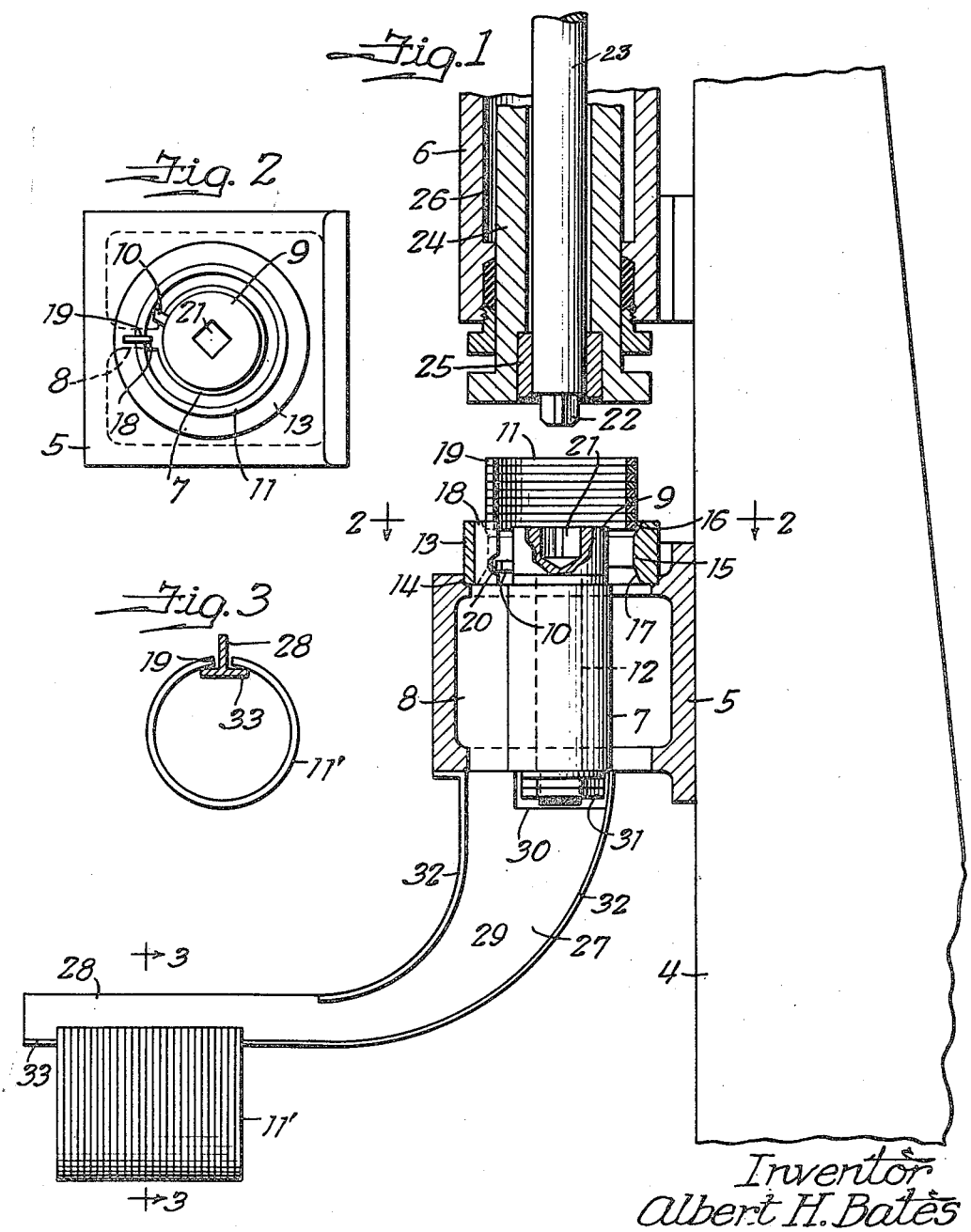
Inventor
Albert H. Bates Patented Mar. 28, 1950

2,501,659

UNITED STATES PATENT OFFICE 2,501,659

RING BORING MACHINE

Albert H. Bates, Rockford, Ill.

Application January 2, 1946, Serial No. 638,610

13 Claims. (Cl. 77—1)

This invention relates to boring machines and is more particularly concerned with machines adapted for boring split piston rings.

Various machines have been designed in which the rings were centered and guided peripherally for feed movement downwardly relative to a boring head, and a longitudinally extending guide rib was disposed between the ends of said rings to prevent rotation thereof in the boring operation. In these machines the driving shaft for the boring head extended downwardly from the head, thus necessitating the provision of a shaft small enough in diameter, at least at one point, to pass through the gaps in the rings guided past the same from the boring head to a discharge point. The small diameter shaft was apt to break and, with that contingency in view, there was usually a separate shaft section of reduced diameter inserted between and suitably detachably coupled to two other shafts, one connected to the boring head and the other to a drive means. It is, therefore, the principal object of my invention to avoid the danger of breakage mentioned and to simplify the construction of ring boring machines by eliminating the necessity for the shaft of reduced diameter.

In the machine of my invention the boring head is mounted for rotation in the guide member, through which the rings are moved past the head, and has a quickly detachable, plug and socket type driving connection with a drive shaft which is rotatably mounted in and movable with the hydraulically operated ram that moves the rings at a feed rate through the guide member. With this novel arrangement the objections present in the old designs are eliminated because there is no necessity for any reduction in the size of the drive shaft at any point and, consequently, no danger of breakage, and there is no problem connected with the discharge of the rings from the machine after completion of the boring operation; they may be guided on a chute to an operator's station for removal or allowed to drop into a receptacle for removal.

In the accompanying drawing:

Fig. 1 is a vertical section through a boring machine made in accordance with my invention;

Fig. 2 is a plan view of the guide member taken on the line 2—2 of Fig. 1, showing the centering and sizing ring and the boring head with the square socket therein for the square plug end of the drive shaft, and Fig. 3 is a vertical sectional detail on the line 3—3 of Fig. 1.

The same reference numerals are applied to corresponding parts in these three views.

The substantially vertical frame of the machine is indicated at 4 and carries a housing 5, which is herein referred to as the guide member, and above it another housing 6. The guide member 5 is in the form of a substantially square hollow housing containing a hollow cylindrical bearing 7 that is supported centrally in the housing on an integral radial web 8 in coaxial relationship to said housing. A boring head 9 carrying one or more tools 10 for boring the piston rings indicated at 11 is mounted for rotation in the bearing 7 on a spindle 12. A centering and sizing ring 13 is mounted in a counterbore 14 in the intake end of the housing 5 and is smoothly and accurately finished and highly polished. The ring 13 is accurately centered relative to the head 9 and its smallest inside diameter 15 is sized closely to suit the ring size being handled. The intake portion of the bore is tapered toward the restricted portion, as indicated at 16, and the discharge end of the bore is flared as indicated at 17. The ring 13 has a radial guide rib 18 mounted therein which is aligned with the web 8 for slidable engagement in the gaps 19 in the rings 11, similarly as in the boring machine disclosed in my copending application, Serial No. 570,998, filed January 1, 1945, now Patent Number 2,437,676 whereby to prevent rotation of the rings during the boring operation. The rib 18 may be of the spring blade construction disclosed in the other application so as to give an expanding or spreading pressure on the opposite ends of the ring at the gap and insure accurate sizing of weaker rings, the inherent spring action of which in some cases is not sufficient to insure their expanding to a tight fit in the restricted throat portion 15 even though they have been compressed by passage through the tapered entrance portion 16 of the bore. The expansion of the rings in passing through the flared outlet end portion 17 of the bore of the sizing ring after the boring operation is enough to allow the gaps to slide freely over the web 8, and the upper end portion of this web is preferably tapered so as to allow the end portions of the rings to slide smoothly off the lower end of the rib 18 and onto the web 8. A portion of the rib 18 is cut away, as indicated at 20 to avoid interference with the tool or tools 10 projecting from the boring head for operation on the inner diameter of the rings 11, enough of the rib being left projecting from the throat 15 of the sizing ring to guide the rings by their gap portions and prevent turning thereof during the boring operation. Of course, a plurality of sizing rings 13 will be provided, having different sized bores 15 to suit the different sizes of piston rings to be bored, and all of these rings are made to fit interchangeably in the counterbore 14.

In accordance with my present invention the boring head 9 is provided with a square socket 21 in the center of the top thereof, in which the square lower plug end portion 22 of the drive shaft 23 is adapted to fit for a quickly detachable driving connection between the boring head and drive shaft. The shaft 23, which may be splined at its upper end for a sliding driving connection with a suitable drive pulley, like a spindle in a drill press, is slidably and rotatably mounted in bearings in the hydraulically operated ram 24, one of which bearings is shown at 25. The ram 24 is preferably part of a piston reciprocable in the cylinder 26 provided in the housing 6, the piston being operable as in the machine of the other application by a commercial high-pressure hydraulic pump, arranged to be regulated by commercial hydraulic controls to perform a cycle of rapid approach, feed, and return. While it is best to operate shaft 23 with hydraulic means interlocked with ram 24, this shaft could be operated by hand or other means well known to the engineering profession. While I have not disclosed a V-trough on which the stack of rings 11 may be aligned with the sizing ring 13, as disclosed in the other application, it will be understood that it or any other guide means for that purpose may be provided. The drive shaft 23 will be moved down by the operator in any suitable way to enter the square plug end 22 in the socket 21 before the cycle for the ram 24 is started, and, after the cycle is completed, the shaft 23 is retracted again to permit placing another stack of rings in the machine. Obviously, there is no need for any reduced and consequently weakened portion in the drive shaft, with my novel arrangement. Hence, the danger of breakage, present in the other designs, is eliminated. Then, too, the whole machine is greatly simplified and reduced in cost as a result of this improved arrangement, because there is no need for a complicated system of guides to conduct the rings from the boring head, as in the other designs, where the guides were extended in intersecting relation to the reduced diameter portion of the drive shaft so that the gap portions of the rings would pass over the shaft. With the present arrangement a single and relatively simple and inexpensive L-shaped guide or chute 27 is sufficient for the purpose of conducting the bored rings 11' from the bottom of the guide member 5 to the rack 28 at the operator's station, the rack being preferably formed as a straight horizontal extension of the lower end of the guide 27. The guide 27 is of I-section, the web portion 29 of which is cut away at 30 at the upper end of the guide to clear the nuts 31 on the lower end of the spindle 12, where the web 29 is aligned with the lower end of the web 8 for smoothly guiding the gap portions of the rings from the guide member 5 onto the guide 27. One of the flanges 32 of the I-section is extended, as at 33, to form a ring supporting ledge on the bottom of the rack 28 and give it an inverted T-section, whereby the rings are slidably guided by their gap portions from the boring head to the rack and are conveniently disposed on the rack for removal a number at a time, using a carrier of the novel form disclosed in my copending application Serial No. 573,690, filed January 20, 1945. This carrier has jaw portions designed to be slipped into the gaps of the rings to expand the rings and carry the same in expanded condition. If desired, the guide 27 and rack 28 may be dispensed with and the rings allowed to drop from the housing 5 into a suitable receptacle.

It is believed the foregoing description conveys a good understanding of the objects and advantages of my invention. The appended claims have been drawn to cover all legitimate modifications and adaptations.

I claim:

1. In a boring mechanism for split piston rings and the like, the combination with a boring spindle, of means for supporting and locating the rings in a predetermined relation to said spindle, means extending through the gaps in the rings to support said boring spindle to permit relative axial movement between the boring spindle and rings, a ram for moving the rings relative to the boring spindle for a machining operation on their inner peripheries, and drive means on the opposite side of said boring spindle from said ring supporting means guided for movement relative to the ram toward and detachably connectable to said boring spindle to turn the same.

2. In a boring mechanism for split piston rings and the like, the combination of a guide member disposed on an upright axis arranged to be slidably engaged by the rings to locate the same relative to the boring spindle, a boring spindle arranged in said guide member in a bearing which has a substantially radial projection for support thereof in said guide member, the radial projection entering the gaps in the rings to prevent turning of said rings, a ram for moving the rings downwardly relative to the boring spindle for a machining operation on their inner peripheries, a drive shaft above said guide member, a support therefor to guide the shaft for movement relative to the ram axially toward the boring spindle, and means providing a detachable driving connection between said shaft and said spindle.

3. In a ring boring machine, the combination of a boring head adapted for internally boring split rings in their movement past said head, a spindle for supporting said head, a support for said spindle spaced radially with respect thereto and arranged to be disposed between the spaced ends of said rings to guide the same in their movement away from the boring head after the boring operation, a ram for moving the rings relative to the boring head for a machining operation on their inner peripheries, and a drive shaft for said boring head disposed on the opposite side thereof from said spindle and movable relative to the ram axially relative to and detachably connectable with said head to turn the same.

4. A structure as set forth in claim 3 wherein said head and shaft have detachably connecting plug and socket means for transmitting torque from said shaft to said boring head.

5. In combination in a boring machine for split piston rings, a boring head, a spindle rotatively supporting said head, a support for the rings locating the same in a predetermined relation to said boring head including a guide entered in the gaps in said rings to prevent turning of said rings, said spindle having a support aligned with said guide and also arranged to enter the gaps in said rings to guide the same in their movement away from the boring head after the boring operation, a ram for moving the rings relative to the boring head for a machining operation on their inner peripheries, and a drive shaft for said boring head disposed on the opposite side thereof from said spindle and movable relative to the ram axially relative to and detachably connectable with said head to turn the same.

6. In a machine for boring split piston rings and the like, guide means for slidable engagement in the ring gaps to prevent turning of the rings in the boring operation and to conduct the rings to a predetermined place for removal from the machine, a boring spindle supported by a portion of said guide means, a ram for moving the rings relative to the boring spindle for a machining operation on their inner peripheries, and a drive shaft for said spindle movable relative to the ram axially relative to and detachably connectable with said spindle to turn the same.

7. In a machine for boring split piston rings and the like, a supporting housing having a spindle supported therein on a radial web designed to enter the gaps in the rings to guide the same after the boring operation, a boring head on said spindle, a ram guided for movement axially toward and away from said boring head to move piston rings relative to said head, and a shaft for driving said boring head and guided in said ram for movement relative to the ram and axial movement relative to said boring head and detachably connectable with said head to turn the same.

8. A machine as set forth in claim 7 including a guide below said housing and aligned with the web and designed to enter the gaps in the rings to guide the same from the bottom of said housing to a station for removal from the machine.

9. In a machine for boring split piston rings and the like, guide means for slidable engagement in the ring gaps to prevent turning of the rings in the boring operation and to conduct the rings to a predetermined place for removal from the machine, a boring spindle supported by a portion of said guide means, a ram guided for movement axially toward and away from said boring spindle to move piston rings relative to said spindle, and a drive shaft guided in said ram for movement relative to the ram and axial movement relative to said spindle and detachably connectable with the said spindle to turn the same.

10. A machine for boring split rings comprising in combination, a substantially upright frame, a housing thereon supporting a sizing ring disposed on an upright axis for centering the rings to be bored by engagement therewith about their peripheries, a boring head in said housing, a cylinder supported on said frame above said housing having a ram movable therein axially relative to said boring head to move rings through said sizing ring past said head, and a drive shaft guided in said ram for movement relative to the ram and axial movement relative to said boring head and detachably connectable with said head to turn the same.

11. A machine as set forth in claim 10 including guide means for slidable engagement in the ring gaps to prevent turning of said rings in the boring operation and to guide the rings by their gaps after the boring operation, and a spindle with which said boring head is supported by a portion of said guide means.

12. In a device of the character described, the combination of a centering ring through which rings are adapted to be moved axially during a machining operation on their inner circumference, plunger means for moving a stack of rings axially through said centering ring at a feed rate relative to a ring boring means, and power operable boring means, including a drive shaft mounted in said plunger for rotation and axial movement to and from an operative position in a predetermined endwise and radial relationship to said centering ring.

13. In a device of the character described, the combination of a sizing and centering ring through which split rings are adapted to be moved axially during a machining operation on their inner circumference, a rib extending longitudinally relative to said sizing and centering ring and engageable in the gaps of the split rings to prevent turning thereof during the machining operation, plunger means for moving a stack of split rings axially through said sizing and centering ring at a feed rate relative to a ring boring means, and power operable boring means, including a drive shaft mounted in said plunger for rotation and axial movement to and from an operative position in a predetermined endwise and radial relationship to said sizing and centering ring.

ALBERT H. BATES.

REFERENCES CITED

The following references are of record in the file of this patent:

UNITED STATES PATENTS

| Number | Name | Date |
| --- | --- | --- |
| 530,823 | Couch | Dec. 11, 1894 |
| 1,946,881 | Porter | Feb. 13, 1934 |
| 2,270,548 | Olson | Jan. 20, 1942 |
| 2,373,344 | Scarff | Apr. 10, 1945 |
| 2,377,960 | Phillips | June 12, 1945 |
| 2,410,819 | Haling | Nov. 12, 1946 |